(12) United States Patent
Kato (10) Patent No.: US 11,784,994 B2
(45) Date of Patent: Oct. 10, 2023

(54) MANAGEMENT DEVICE, MANAGEMENT SYSTEM, AND NON-TRANSITORY COMPUTER READABLE MEDIUM

(71) Applicant: FUJIFILM Business Innovation Corp., Tokyo (JP)

(72) Inventor: Junya Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 418 days.

(21) Appl. No.: 16/551,735

(22) Filed: Aug. 27, 2019

(65) Prior Publication Data

US 2020/0076793 A1   Mar. 5, 2020

(30) Foreign Application Priority Data

Sep. 3, 2018   (JP) ................. 2018-164515

(51) Int. Cl.
*H04L 9/40*         (2022.01)
*G06F 16/955*       (2019.01)
*G06F 21/41*        (2013.01)
*H04L 65/65*        (2022.01)
*G06F 21/45*        (2013.01)

(52) U.S. Cl.
CPC ........ *H04L 63/0815* (2013.01); *G06F 16/955* (2019.01); *G06F 21/41* (2013.01); *G06F 21/45* (2013.01); *H04L 65/65* (2022.05)

(58) Field of Classification Search
CPC .............. G06F 16/435; G06F 16/9535; H04L 63/0823; H04L 63/0876; H04L 67/104
See application file for complete search history.

(56) References Cited

U.S. PATENT DOCUMENTS

| | | | |
|---|---|---|---|
| 7,117,528 B1* | 10/2006 | Hyman | G06F 21/45 726/1 |
| 8,595,810 B1* | 11/2013 | Ben Ayed | H04L 63/0815 713/168 |
| 10,176,335 B2 | 1/2019 | Adams et al. | |
| 2011/0277016 A1* | 11/2011 | Hockings | G06F 21/41 726/8 |
| 2014/0165150 A1* | 6/2014 | Brunswig | G06F 21/41 726/4 |
| 2016/0105420 A1* | 4/2016 | Engan | H04W 12/068 455/411 |
| 2018/0033095 A1* | 2/2018 | Ocean | G06Q 50/01 |
| 2018/0205720 A1* | 7/2018 | Westerlund | H04L 65/65 |

FOREIGN PATENT DOCUMENTS

JP         6140268        5/2017

* cited by examiner

*Primary Examiner* — Barbara B Anyan
(74) *Attorney, Agent, or Firm* — JCIPRNET (57) ABSTRACT

A management device includes a receiving unit that receives a link request to link a user ID of a user from a link origin, and a control unit that, in response the link request, requests the user to input unique information of the link origin, and does not execute a linking of the user ID in a case in which the unique information input from the user is incorrect.

9 Claims, 6 Drawing Sheets

| INTERNAL MANAGEMENT ID | EMAIL ADDRESS | LAST NAME | FIRST NAME |
|---|---|---|---|
| xx-yy-001 | fuji.tarou@fujixerox.co.jp | FUJI | TARO |
| xx-yy-002 | fuji.hanako@fujixerox.co.jp | FUJI | HANAKO |
| xx-yy-003 | maru@xxx.com | MARU | ICHIROU |
| xx-yy-004 | batsu@yyy.com | BATSU | JIROU |

MANAGEMENT DEVICE, MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-164515 filed Sep. 3, 2018.

BACKGROUND

(i) Technical Field

The present disclosure relates to a management device, a management system, and a non-transitory computer readable medium.

(ii) Related Art

There exists "single sign-on" (SSO) or "single ID" technology that allows a user to obtain access to multiple software systems by logging in a single time.

Japanese Patent No. 6140268 describes how, in the case in which SSO is implemented locally (on-premises), if SSO is not functioning, the user is unable to log in to both the on-premises service and a cloud service, and therefore proposes a method including: a step of verifying user credential information associated with a computer; a step of receiving, from the computer, information indicating a domain with which a single ID is to be established; a step of storing information indicating a domain inside a directory service on a cloud computing platform to approve sign-on from a user of the domain in response to the step of verifying the user credential information, in which the directory service includes a database used to authenticate a user or a computer inside the domain; a step of deciding to allow login to a second computer in response to a determination that the directory service approves the credential information associated with the login; and a step of approving the credential information associated with the login to access a software service provided on the cloud computing platform in response to a determination that the directory service has approved the credential information associated with the login.

SUMMARY

Meanwhile, when linking a locally-operated (on-premises) user ID and a cloud service user ID in "single sign-on" (SSO), in the case in which an on-premises administrator with malicious intent registers a user ID unrelated to an on-premises user, when a user having that user ID actually exists, a situation occurs in which IDs are linked incorrectly, and harmful effects such as ID management being stolen by the administrator with malicious intent may occur. The same also applies to cases in which an administrator with good intent makes a mistake in operation.

Aspects of non-limiting embodiments of the present disclosure relate to a technology in the case in which, when linking a link origin user ID and a link destination user ID, a user ID unrelated to the link origin is registered by an administrator with malicious intent or the like, the technology being capable of avoiding the linkage of user IDs even when a user having the user ID exists.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a management device including: a receiving unit that receives a link request to link a user ID of a user from a link origin; and a control unit that, in response to the link request, requests the user to input unique information of the link origin, and does not execute a linking of the user ID in a case in which the unique information input from the user is incorrect.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment of the present disclosure will be described on the basis of the drawings.

Figure 1:
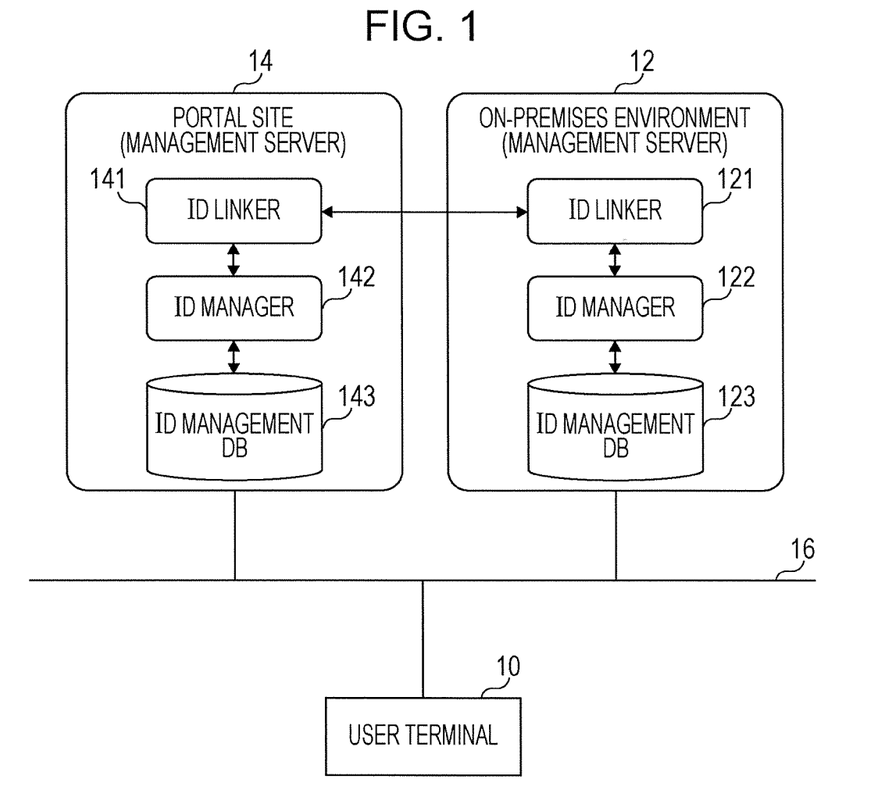
FIG. 1 is a system configuration diagram according to an exemplary embodiment.

FIG. 1 is a system configuration diagram according to the exemplary embodiment. The system is provided with a user terminal 10, an on-premises environment 12, and a portal site 14, which are connected by a network 16 allowing data to be transmitted and received.

The on-premises environment 12 is a management server operated and managed locally by a company or the like to which a user who operates the user terminal 10 belongs, and is the link origin server when linking IDs. The management server of the on-premises environment 12 is provided with an ID linker 121, an ID manager 122, and an ID management database (DB) 123 as function blocks.

The ID linker 121 executes a linking process for linking a user ID of the on-premises environment 12 with a user ID of the portal site 14. In other words, the ID linker 121 transmits to the portal site 14 a request to link the user ID of a user to link. Also, when there is a request for an ID inquiry from the portal site 14, the ID linker 121 executes an inquiry process in response, and transmits the inquiry result to the portal site 14.

The ID management database 123 stores user IDs of the on-premises environment 12. User IDs are stored by registering an internal management ID, an email address, the first and last name, and the like of each user in a user ID management table for example. The administrator of the on-premises environment 12 is able to register, remove, and update user information in the user ID management table as appropriate.

The ID manager 122 manages the user IDs by accessing the ID management database 123 and appropriately registering, removing, or updating the user information of the on-premises environment 12. For example, in the case of adding a new user to the on-premises environment 12, an internal management ID, email address, and first and last name of the new user are newly registered in the user ID management table. Also, in the case of withdrawing an existing user from the on-premises environment 12, the record of the user is deleted from the user ID management table. In particular, the ID manager 122 accesses the ID management database 123 in response to a request from the ID linker 121 to acquire and provide the internal management ID of each user to the ID linker 121.

The portal site 14 is a site operated and managed by an external company other than the company or the like to which the user who operates the user terminal 10 belongs, such as a management server that provides one or multiple cloud services for example, and is the link destination server when linking IDs. The portal site 14 achieves "single sign-on" (SSO) by linking the user ID of a user of the on-premises environment 12 with a user ID of the portal site 14. If SSO is achieved, the user of the on-premises environment 12 is able to simply log in to the on-premises environment 12, and thereby also log in to the various cloud services of the portal site 14 automatically and receive these cloud services. By achieving SSO, authentication information for the on-premises environment 12 and authentication information for the portal site 14 is standardized or synchronized. Note that the standardizing or synchronizing of authentication information may include replicating the authentication information for the portal site 14 in the authentication information for the on-premises environment 12.

The management server of the portal site 14 is provided with an ID linker 141, an ID manager 142, and an ID management database (DB) 143 as function blocks.

The ID linker 141 cooperates with the ID linker 121 of the on-premises environment 12 to execute a linking process for linking a user ID of the on-premises environment 12 with a user ID of the portal site 14. In particular, when the ID linker 141 receives an ID link request from the ID linker 121 of the on-premises environment 12, the ID linker 141 transmits an ID link confirmation email to the user to link, and requests the input of unique information. Subsequently, the authenticity of the input unique information is determined. If the unique information is correct, the ID linking process is executed, whereas if incorrect, the ID linking process is denied.

The ID management database 143 stores user IDs of the portal site 14.

The ID manager 142 manages the user IDs by accessing the ID management database 143 and appropriately registering, removing, or updating the user information of the portal site 14.

Herein, in the case of linking a link origin user ID and a link destination user ID for "single sign-on" (SSO), when using domain authentication like in the technology described in Japanese Patent No. 6140268, it is necessary to be able to edit the record of the domain under the presumption that one is an administrator of the domain, and the case in which domain authentication is not performed is unsupported. As a different method, it is conceivable to transmit an ID link confirmation email to a specific email address, cause the user to access a URL stated in the email, and enable ID linking only after the user gives consent, but the user may give consent mistakenly, and in this case, there is a risk that the email address will be taken over as a user ID by an administrator with malicious intent.

In other words, if the administrator of the link origin requests ID linking with the link destination by specifying an email address unrelated to the user of the link origin, an ID link confirmation email is transmitted to the email address at the link destination, but if the actual user at that email address mistakenly gives consent, an ID link with the email address as the user ID will be established, and an administrator with malicious intent will be able to use the email address as the user ID to enjoy the various services of the link destination. Consequently, with the technology that executes ID linking by only presuming that the email address of the user is correct, it is difficult to avoid harmful effects such as ID management being stolen by an administrator with malicious intent.

Accordingly, in the present exemplary embodiment, a user of the on-premises environment 12 is assigned an internal management ID other than an email address as unique information proving that the user is a user of the on-premises environment 12, and when the user consents to ID linking, the user is prompted to input the internal management ID, and ID linking is enabled in the case in which the authenticity of the internal management ID is secured.

The management server included in the on-premises environment 12 is provided with one or multiple processors, ROM, RAM, a communication interface (I/F), an input/output I/F, and a storage device such as a hard disk drive (HDD) or a solid-state drive (SSD). The one or multiple processors read out and execute a processing program stored in the ROM or the storage device, and thereby realize the ID linker 121 and the ID manager 122. Also, the storage device realizes the ID management DB 123. Likewise, the management server included in the portal site 14 similarly is provided with one or multiple processors, ROM, RAM, a communication interface (I/F), an input/output I/F, and a storage device such as a hard disk drive (HDD) or a solid-state drive (SSD). The one or multiple processors read out and execute a processing program stored in the ROM or the storage device, and thereby realize the ID linker 141 and the ID manager 142. Also, the storage device realizes the ID management DB 143.

The functions realized by the processor of the portal site 14 executing the processing program are as follows.

Receiving an ID link request from the ID linker 121 of the on-premises environment 12 of the link origin Transmitting an ID link confirmation email to the user to link Requesting the input of unique information from the user to link Receiving unique information input from the user to link Acquiring the unique information of the user to link from the ID linker 121 of the on-premises environment 12

Figure 2:
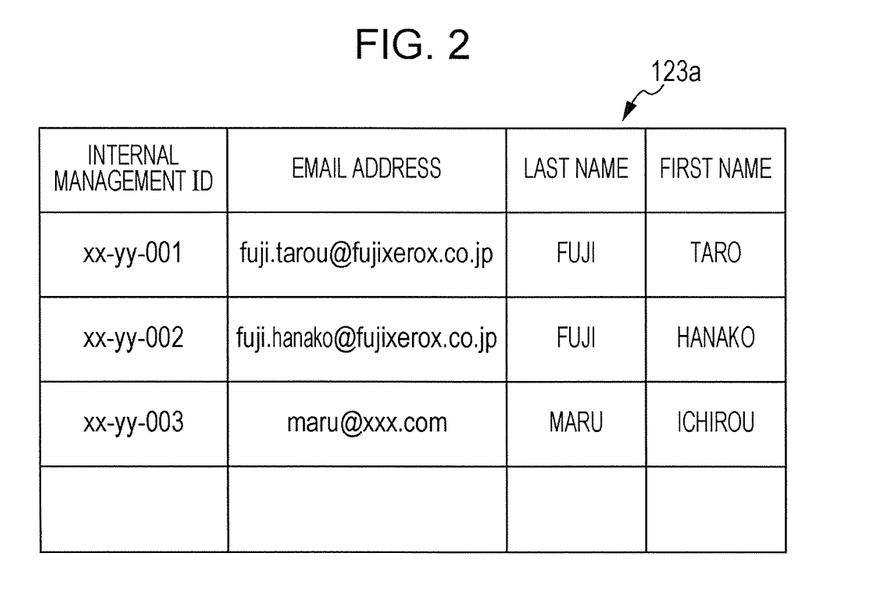
FIG. 2 is an explanatory diagram illustrating a user ID management table according to the exemplary embodiment.

Comparing the unique information input from the user to the unique information acquired from the on-premises environment 12, and executing the ID linking process in the case of a match, or denying the ID linking process in the case of a non-match FIG. 2 illustrates one example of an ID management table 123*a* stored in the ID management DB 123 of the on-premises environment 12. In the ID management table 123*a*, an internal management ID, an email address, and a first and last name are registered for each user of the on-premises environment 12. The email address is used as a user ID in the on-premises environment 12. Also, the internal management ID is unique information, different from the email address, for proving that the user is a user of the on-premises environment 12. For example, a user with the name "Taro Fuji" is assigned "xx-yy-001" as the internal management ID. When an ID link is requested from the ID linker 121 of the on-premises environment 12 that is the link origin, the ID linker 141 of the portal site 14 executes ID linking after first using the internal management ID to confirm that the user targeted for ID linking is a genuine user of the on-premises environment 12.

Note that the internal management ID may use an arbitrary numeral or character string to indicate a user of the on-premises environment 12. The internal management ID is information that is unique to the system of the on-premises environment 12.

Figure 3:
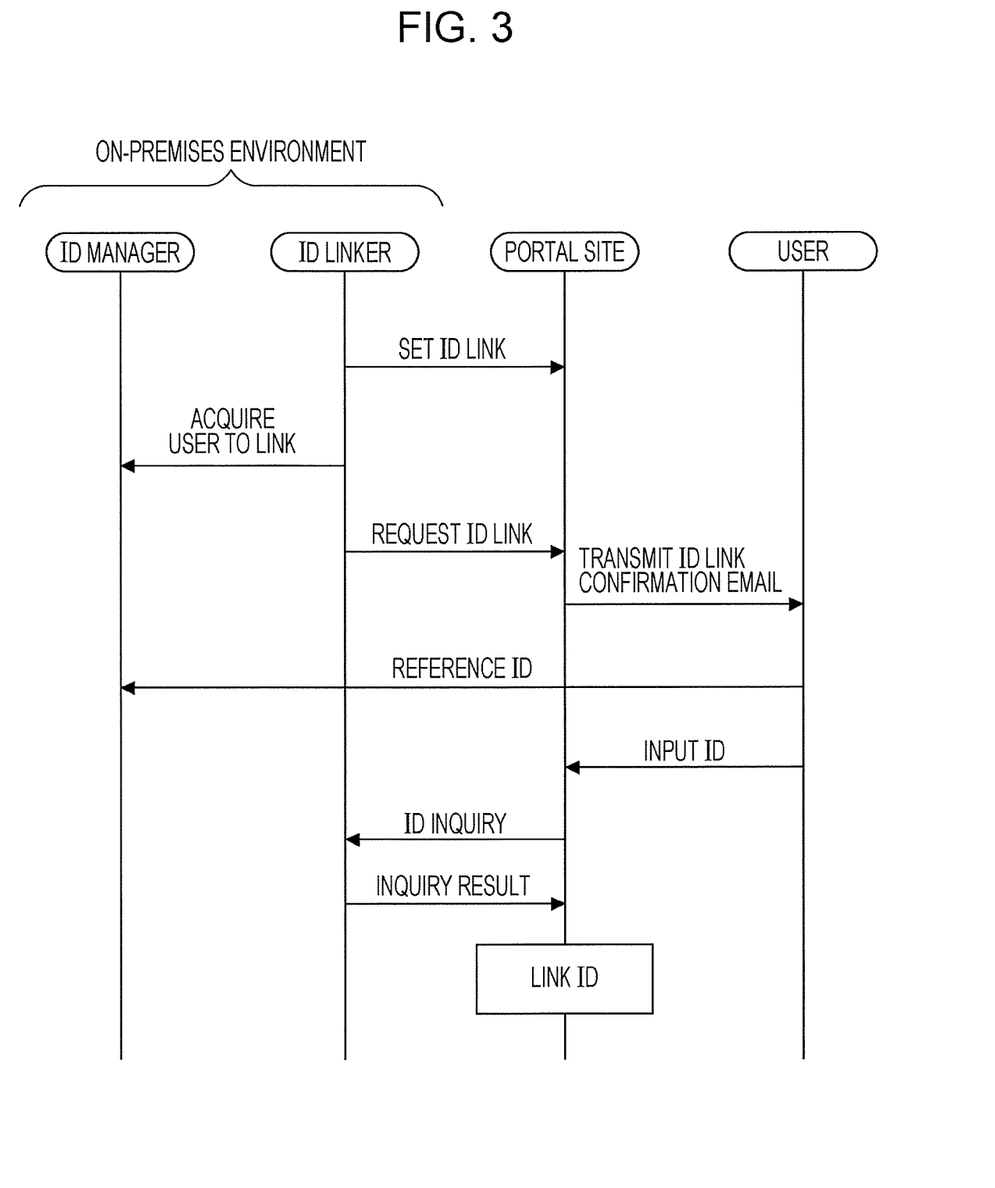
FIG. 3 is a process flowchart according to the exemplary embodiment.

FIG. 3 illustrates a process flowchart according to the exemplary embodiment. This is a process between the on-premises environment 12, the portal site 14 of the link destination, and the user terminal 10.

First, the ID linker 121 of the on-premises environment 12 requests the portal site 14 to set an ID link. The ID linker 141 of the portal site 14 switches to an ID linking process mode according to the setting request.

Next, the ID linker 121 of the on-premises environment 12 requests the ID manager 122 for information about the user to link. In response to the request from the ID linker 121, the ID manager 122 accesses the ID management DB 123, acquires the internal management DB, email address, and first and last name of the user to link, and replies to the ID linker 121.

Next, the ID linker 121 transmits to the ID linker 141 of the portal site 14 an ID link request specifying the email address of the user to link. The user ID to link is the email address of the user to link, and is "fujitarou@fujixerox.co.jp" for example.

In response to the request, the ID linker 141 of the portal site 14 uses the email address transmitted from the ID linker 121 to transmit an ID link confirmation email to the user terminal 10 of the user to link. The ID link confirmation email indicates that an ID link has been requested, and also includes service content that may be utilized by ID linking (SSO). Additionally, the ID link confirmation email includes a request to input the internal management ID used in ID linking. Specifically, the ID link confirmation email contains the URL of a specific web page, and when the URL is accessed, the page of a screen for inputting the internal management ID used in ID linking is displayed by a web browser of the user terminal 10.

The ID link target user, by opening the ID link confirmation email transmitted to the user terminal 10 and additionally accessing the URL stated in the email, grasps that the internal management ID is used in ID linking.

For this reason, the user operates the user terminal 10, accesses the ID manager 122 of the on-premises environment 12, and references one's own internal management ID. If the user is a user of the on-premises environment 12 and also a user registered in the ID management table 123a of the ID management DB 123, an internal management ID is assigned, and therefore the user is able to acquire one's own internal management ID.

Having acquired one's own internal management ID, the user inputs and transmits the internal management ID requested by the ID link confirmation email to the ID linker 141 of the portal site 14.

The ID linker 141 of the portal site 14 receiving the internal management ID from the user terminal 10 requests the ID linker 121 of the on-premises environment 12 for an inquiry of the internal management ID. The ID linker 121 of the on-premises environment 12 compares the internal management ID received from the ID linker 141 of the portal site 14 to the internal management ID of the user acquired from the ID manager 122, and determines whether or not the two match. In the case in which the internal management ID transmitted from the user terminal 10 and the internal management ID stored in the ID management DB 123 match, the user associated with the user terminal 10 is a genuine user of the on-premises environment 12, and therefore the ID linker 141 of the portal site 14 links the user ID of the on-premises environment 12, or in other words the email address, with an ID in the portal site 14, and standardizes the user's authentication information for the on-premises environment 12 with the authentication information for the portal site 14 to enable SSO for the user. By logging in to the on-premises environment 12, the user is able to receive various services of the portal site 14 automatically.

On the other hand, in the case in which the internal management ID is not transmitted from the user terminal 10, or in the case in which the internal management ID is transmitted but the result of the comparison is a non-match, the ID linker 141 of the portal site 14 denies ID linking even though an ID link request has been received. Consequently, in this case, SSO is not realized, and even if the user logs in to the on-premises environment 12, the user is unable to utilize the portal site 14 directly. Note that the ID linker 141 of the portal site 14 may also reply to the ID linker 121 of the on-premises environment 12 with the execution/denial of ID linking.

Figure 4:
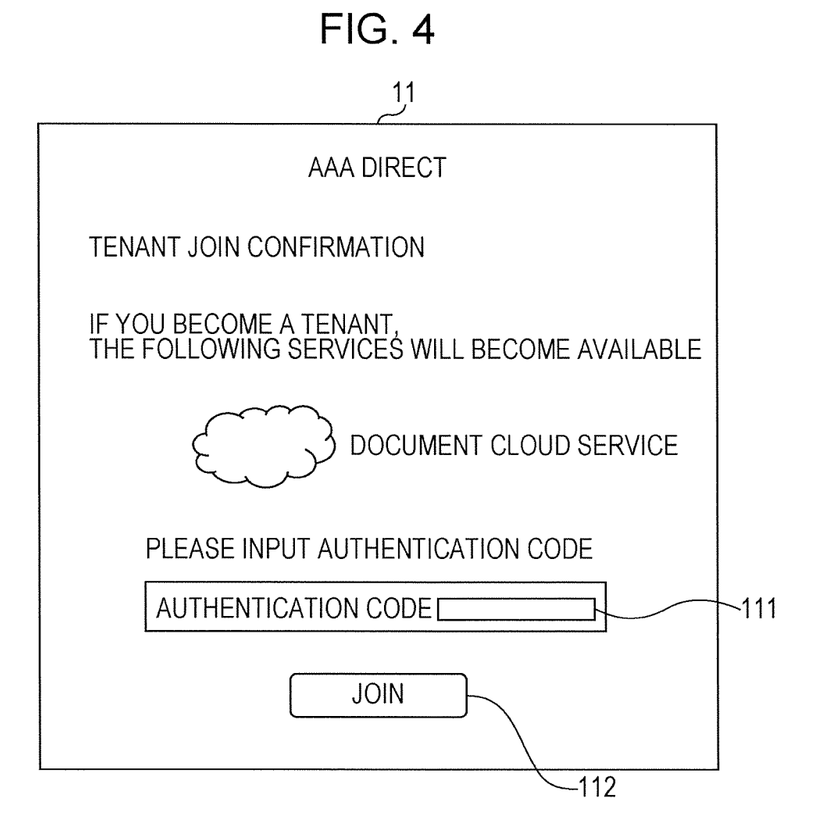
FIG. 4 is an explanatory diagram illustrating an example of a screen displayed on a user terminal according to the exemplary embodiment.

FIG. 4 illustrates one example of a screen 11 displayed on a display of the user terminal 10 in the case in which the user operates the user terminal 10 to access a URL stated in the ID link confirmation email. A web browser installed on the user terminal 10 displays the screen 11 by displaying a web page specified by the URL according to the URL link operation by the user. On the screen 11, a document cloud service is indicated as the service content that may be utilized by ID linking (SSO), while in addition, an input field ill requesting the input of an authentication code as the internal management ID for executing ID linking is displayed. The user inputs the internal management ID acquired from the on-premises environment 12 into the input field 111 and operates a join button 112, thereby transmitting the authentication code as the internal management ID to the ID linker 141 of the portal site 14.

At this point, suppose a case in which an administrator of the on-premises environment 12 with malicious intent attempts to execute ID linking by specifying an email address totally unrelated to the email address associated with the ID link target user. The email address that is totally unrelated to the ID link target user is designated a false email address.

Figure 5:
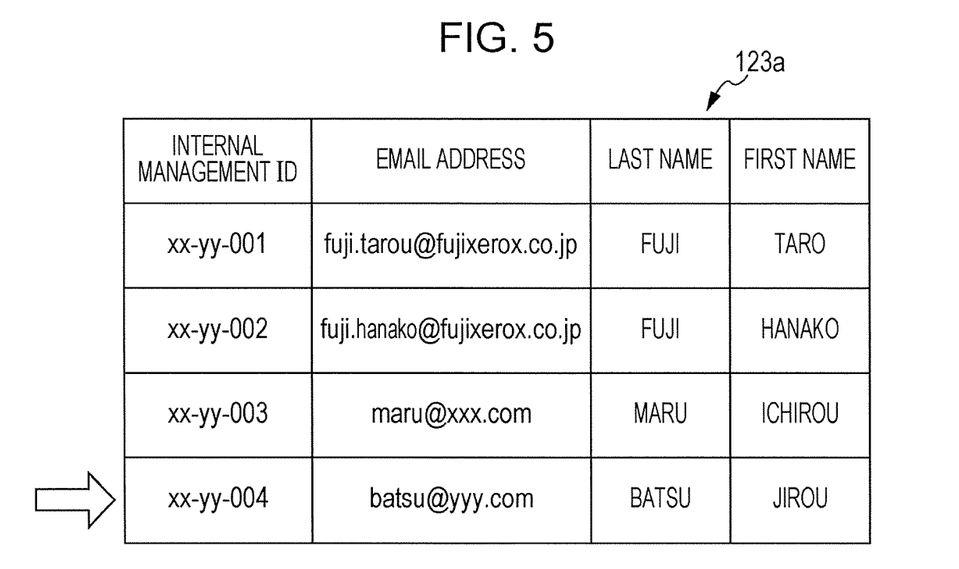
FIG. 5 is an explanatory diagram illustrating a user ID management table to which a false email address has been added according to the exemplary embodiment.

FIG. 5 illustrates a case in which a false email address has been registered in the ID management table 123a of the on-premises environment 12 by an administrator with malicious intent. In the diagram, as indicated by the arrow, assume that a false email address "batsu@yyy.com" and a false internal management ID are registered under the name "Jirou Batsu".

The ID linker 121 issues to the ID linker 141 of the portal site 14 an ID link request specifying the false email address "batsu@yyy.com", and the ID linker 141 of the portal site 14 transmits an ID link confirmation email addressed to the false email address "batsu@yyy.com". If the false email address "batsu@yyy.com" does not actually exist, the ID link confirmation email is not transmitted to the user terminal 10, nor is ID linking executed. Hypothetically, in the case in which the false email address "batsu@yyy.com" exists, the ID link confirmation email is transmitted to an unrelated user at the false email address "batsu@yyy.com", but since the unrelated user associated with the false email address "batsu@yyy.com" is not a genuine user of the on-premises environment 12, the user is unable to reference the internal management ID managed by the ID management DB 123 of the on-premises environment 12. Consequently, the user is unable to input and transmit the internal management ID to the ID linker 141 of the portal site 14, and ID linking is not executed.

Figure 6:
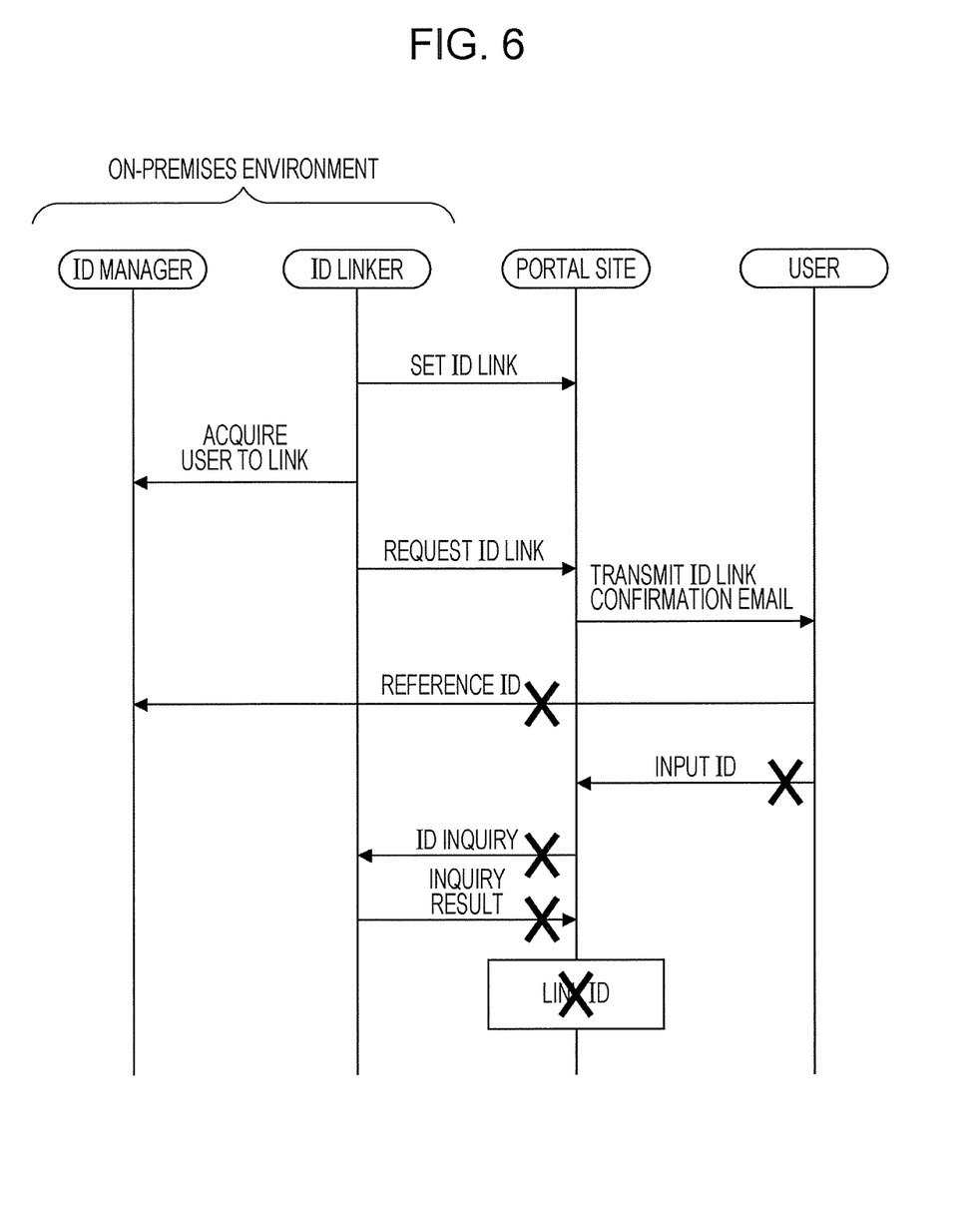
FIG. 6 is another process flowchart according to the exemplary embodiment.

FIG. 6 illustrates a process flowchart for the case in which the false email address "batsu@yyy.com" is specified. Unlike the process flowchart in FIG. 3, an X mark denotes that the ID reference from the user terminal 10, the ID input, the inquiry from the ID linker 141 of the portal site 14 to the ID linker 121 of the on-premises environment 12, the reply of the inquiry result from the ID linker 121 of the on-premises environment 12 to the ID linker 141 of the portal site 14, and the ID linking process in the ID linker 141 of the portal site 14 are all not executed. With this arrangement, the taking over of a user ID by an administrator with malicious intent is avoided.

The case in which an administrator with no malicious intent accidentally specifies a false email address is also similar, and the ID reference from the user terminal 10, the ID input, the inquiry from the ID linker 141 of the portal site 14 to the ID linker 121 of the on-premises environment 12, the reply of the inquiry result from the ID linker 121 of the on-premises environment 12 to the ID linker 141 of the portal site 14, and the ID linking process in the ID linker 141 of the portal site 14 are all not executed.

In this way, in the present exemplary embodiment, a user may be confirmed to be a genuine user by having the ID link target user reference the internal management ID of the on-premises environment 12 and input the internal management ID, or a user may be confirmed to be a genuine user by using domain authentication technology.

Figure 7:
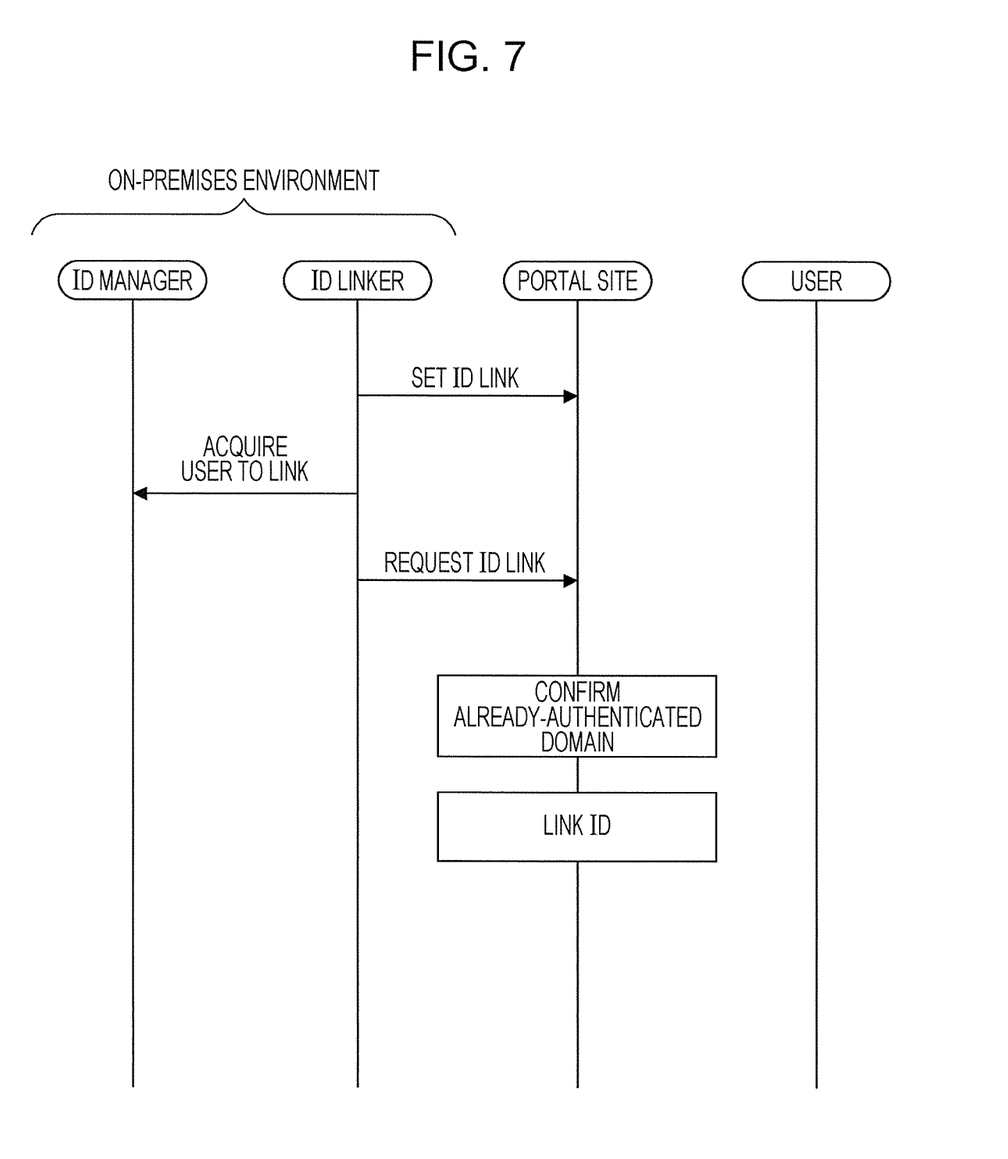
FIG. 7 is yet another process flowchart according to the exemplary embodiment.

FIG. 7 illustrates a process flowchart for this case. This is a process between the on-premises environment 12, the portal site 14 of the link destination, and the user terminal 10.

First, the ID linker 121 of the on-premises environment 12 requests the portal site 14 to set an ID link. The ID linker 141 of the portal site 14 switches to an ID linking process mode according to the setting request.

Next, the ID linker 121 of the on-premises environment 12 requests the ID manager 122 for information about the user to link. In response to the request from the ID linker 121, the ID manager 122 accesses the ID management DB 123, acquires information about the user to link, and replies to the ID linker 121.

Next, the ID linker 121 transmits to the ID linker 141 of the portal site 14 an ID link request specifying the user to link.

In response to the request, the ID linker 141 of the portal site 14 determines whether or not the domain to which the ID link target user is an authenticated domain. For example, if the domain of the ID link target user is "fujixerox.co.jp", and the domain is authenticated, the user belonging to the domain is treated as a genuine user, and the ID linking process is executed.

On the other hand, in the case in which the domain to which the ID link target user is not authenticated, for example, if the domain to which the ID link target user belongs is "yyy.com" and the domain is unauthenticated, the user belonging to the domain is not treated as a genuine user, and the ID linking process is not executed. Note that in the case of an unauthenticated domain, the process flowchart in FIG. 3 may be followed such that an ID link confirmation email is transmitted to the email address of the ID link target user, the input of the internal management ID is requested, and if the internal management ID comparison result is valid, the ID linking process is executed, whereas if the comparison result is invalid, the ID linking process is denied.

The foregoing describes exemplary embodiments of the present disclosure, but the present disclosure is not limited to these exemplary embodiments, and various modifications and applications are possible. Hereinafter, exemplary modifications will be described.

Exemplary Modification 1

Figure 8:
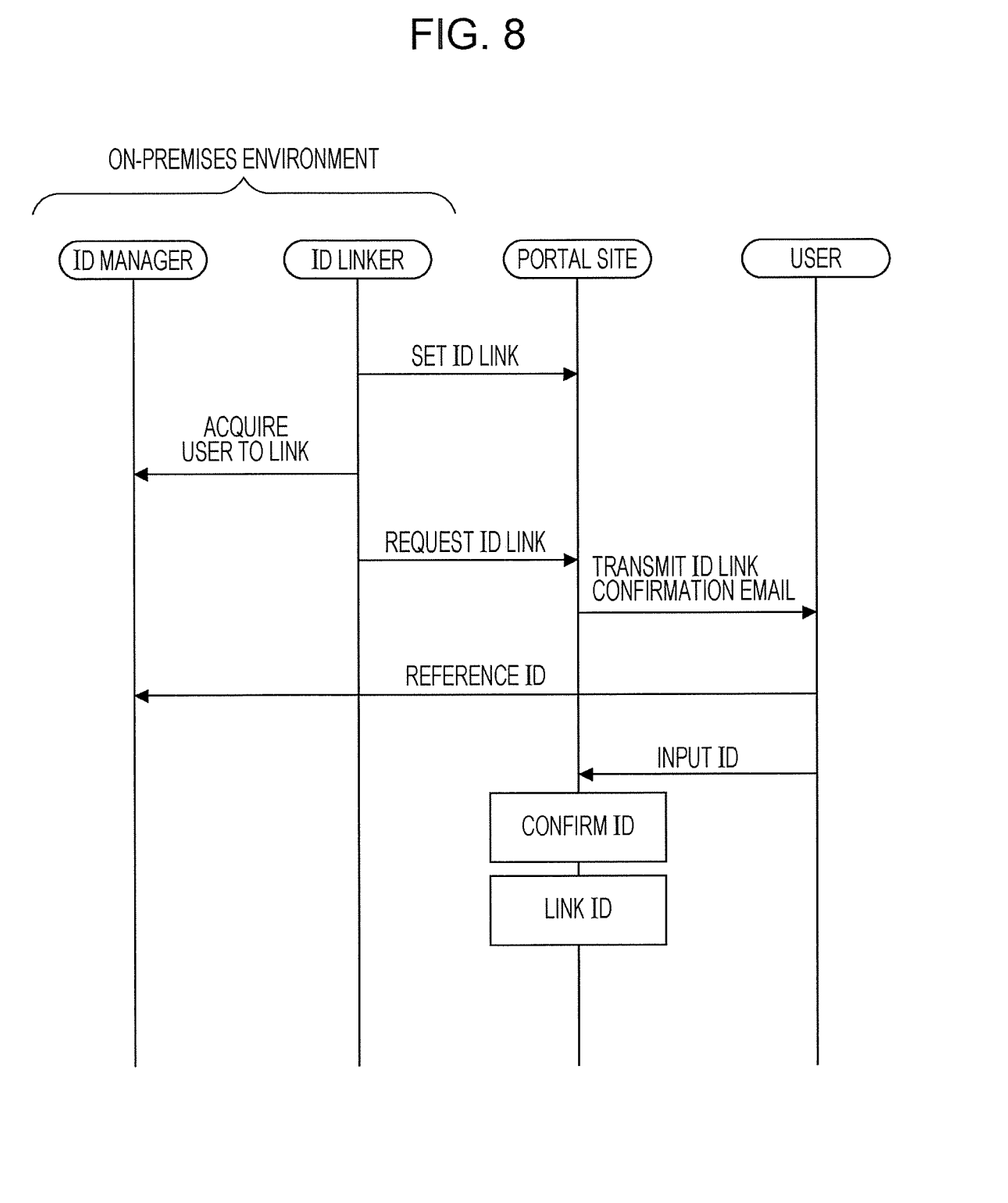
FIG. 8 is a process flowchart according to an exemplary modification.

FIG. 8 is a process flowchart according to an exemplary modification. This is a process between the on-premises environment 12, the portal site 14 of the link destination, and the user terminal 10.

First, the ID linker 121 of the on-premises environment 12 requests the portal site 14 to set an ID link. The ID linker 141 of the portal site 14 switches to an ID linking process mode according to the setting request.

Next, the ID linker 121 of the on-premises environment 12 requests the ID manager 122 for information about the user to link. In response to the request from the ID linker 121, the ID manager 122 accesses the ID management DB 123, acquires the internal management DB, email address, and first and last name of the user to link, and replies to the ID linker 121.

Next, the ID linker 121 transmits to the ID linker 141 of the portal site 14 an ID link request specifying the email address of the user to link.

Also, at the same time as the ID link request, the ID linker 121 transmits the internal management ID of the ID link target user according to the inquiry to the ID linker 141 of the portal site 14.

Next, the ID linker 141 of the portal site 14 uses the email address transmitted from the ID linker 121 to transmit an ID link confirmation email to the user terminal 10 of the user to link. The ID link confirmation email indicates that an ID link has been requested, and also includes service content that may be utilized by ID linking (SSO). Additionally, the ID link confirmation email includes a request to input the internal management ID used in ID linking. Specifically, the ID link confirmation email contains a URL, and when the URL is accessed, a screen for inputting the internal management ID used in ID linking is displayed.

The ID link target user opens the ID link confirmation email transmitted to the user terminal 10, accesses the URL stated in the email, and grasps that the internal management ID is used in ID linking.

Next, the user operates the user terminal 10, accesses the ID manager 122 of the on-premises environment 12, and references one's own internal management ID. If the user is a user of the on-premises environment 12 and also a user registered in the ID management table 123a of the ID management DB 123, an internal management ID is assigned, and therefore the user is able to acquire one's own internal management ID.

Having acquired one's own internal management ID, the user inputs and transmits the internal management ID requested by the ID link confirmation email to the ID linker 141 of the portal site 14.

The ID linker 141 of the portal site 14 receiving the internal management ID from the user terminal 10 uses the internal management ID acquired from the ID linker 121 of the on-premises environment 12 to determine whether or not the two match. If the internal management ID input from the user matches the internal management ID acquired from the ID linker 121 of the on-premises environment 12, the user associated with the user terminal 10 is a genuine user of the on-premises environment 12, and therefore the ID linker 141 of the portal site 14 links the user ID of the on-premises environment 12, or in other words the email address, with an ID in the portal site 14 to enable SSO for the user.

On the other hand, in the case in which the two do not match (also including the case in which an internal management ID is not input from the user terminal 10), the ID linker 141 of the portal site 14 denies ID linking even though an ID link request has been received. Consequently, in this case, SSO is not realized, and even if the user logs in to the on-premises environment 12, the user is unable to utilize the portal site 14 directly. The ID linker 141 of the portal site 14 may also reply to the ID linker 121 of the on-premises environment 12 with the execution/denial of ID linking.

In this exemplary modification, the ID linker 141 of the portal site 14 acquires the internal management ID of the ID link target user in advance, and may be said to confirm the internal management ID input by the ID link target user.

Exemplary Modification 2

In the exemplary embodiment, as illustrated in FIG. 2, the internal management ID to treat as unique information is assigned uniquely to each user, but since it is sufficient to recognize that the ID link target user is a user of the on-premises environment 12, the internal management ID may also be a management ID shared among the users of the on-premises environment 12. For example, in the ID management table 123a of FIG. 2, the internal management ID is set to "xxx-yyy-zzz" irrespective of user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management device comprising:
    a receiving unit that receives, from a link origin, a link request to link a user ID of a user between the management device and the link origin, wherein the link origin is a management server to which the user has subscribed; and
    a control unit that, in response to the link request, requests the user to input a first unique information of the link origin, acquires externally a second unique information from the link origin, compares the first unique information input from the user to the second unique information acquired from the link origin, execute the link to link the user ID between the management device and the management server in response to the first unique information matching the second unique information, and does not execute the link in a case in which the first unique information not matching the second unique information,
    in response to the link request, the control unit further receives from the link origin an email address of the user, transmit to the user a confirmation email which requests from the user the first unique information of the link origin by using the email address, and receive the first unique information in response to transmitting the confirmation email, and
    in response to receiving the first unique information, the control unit further transmit an inquiry for the second unique information from the link origin, and the second unique information is received from the link origin in response to transmitting the inquiry.

2. The management device according to claim 1, wherein the control unit acquires the second unique information of the user by transmitting an inquiry to the link origin.

3. The management device according to claim 1, wherein the second unique information of the link origin is unique information shared among users of the link origin.

4. The management device according to claim 1, wherein the second unique information of the link origin is unique information that is unique to each user of the link origin.

5. The management device according to claim 1, wherein the first unique information or the second unique information is an ID used to subscribe to the link origin and is stored within the link origin.

6. A management system comprising:
    a link origin server; and a link destination server, wherein
    the link origin server is a management server to which the user has subscribed and is configured to transmit a link request to link a user ID of a user between the link origin server and the destination server, and
    the link destination server includes
    a transmitting unit that, when the link request is received from the link origin server, transmits a link confirmation email to the user to link and also requests an input of a first unique information,
    an acquiring unit that acquires a second unique information of the user to link from the link origin server, and
    a control unit that in response to the link request, acquires the second unique information of the user to link from the link origin server, compares the first unique information input from the user with the second unique information acquired from the link origin server to execute the link to link the user ID between the link origin server and the link destination server in response to the first unique information matching the second unique information, and does not execute the link in a case in which the first unique information not matching the second unique information,
    in response to the link request, the control unit further receives from the link origin an email address of the user, transmit to the user a confirmation email which requests from the user the first unique information of the link origin by using the email address, and receive the first unique information in response to transmitting the confirmation email, and
    in response to receiving the first unique information, the control unit further transmit an inquiry for the second unique information from the link origin, and the second unique information is received from the link origin in response to transmitting the inquiry.

7. The management system according to claim 6, wherein in response to the link request, the link destination server receives from the link origin server an email address of the user, transmit to the user a confirmation email which requests from the user the first unique information of the link origin server by using the email address, and receive the first unique information in response to transmitting the confirmation email.

8. A non-transitory computer readable medium storing a program causing a computer to execute a process by a management device for managing information, the process comprising:
  receiving, from a link origin, a link request to link a user ID of a user between the management device and the link origin, wherein the link origin is a management server to which the user has subscribed;
  in response to the link request, requesting the user to input a first unique information of the link origin, acquires externally a second unique information from the link origin, compares the first unique information input from the user to the second unique information acquired from the link origin, execute the link to link the user ID between the management device and the management server in response to the first unique information matching the second unique information, and does not execute the link in a case in which the first unique information not matching the second unique information;
  in response to the link request, receiving from the link origin an email address of the user, transmit to the user a confirmation email which requests from the user the first unique information of the link origin by using the email address, and receive the first unique information in response to transmitting the confirmation email, and
  in response to receiving the first unique information, transmitting an inquiry for the second unique information from the link origin, and the second unique information is received from the link origin in response to transmitting the inquiry.

9. The non-transitory computer readable medium according to claim 8, wherein
  in response to the link request, the control unit receives from the link origin an email address of the user, transmit to the user a confirmation email which requests from the user the first unique information of the link origin by using the email address, and receive the first unique information in response to transmitting the confirmation email.

\* \* \* \* \*